(12) United States Patent
Chung et al.

(10) Patent No.: US 7,548,083 B2
(45) Date of Patent: Jun. 16, 2009

(54) TEST APPARATUS HAVING AUTO PROBE THAT CONTACTS A DISPLAY DEVICE AND TEST METHOD USING THE SAME

(75) Inventors: Han Rok Chung, Daegu (KR); Byun Sung Nam, Changwon (KR)

(73) Assignee: LG.Display Co., Ltd., Seoul (KR)

( * ) Notice: Subject to any disclaimer, the term of this patent is extended or adjusted under 35 U.S.C. 154(b) by 0 days.

(21) Appl. No.: 11/141,220

(22) Filed: May 31, 2005

(65) Prior Publication Data

US 2005/0264309 A1    Dec. 1, 2005

(30) Foreign Application Priority Data

May 31, 2004    (KR)    ........................ 10-2004-0039352

(51) Int. Cl.
   *G01R 31/02*    (2006.01)
(52) U.S. Cl. ...................... 324/770; 324/754
(58) Field of Classification Search ................. 324/770, 324/158.1, 765, 500–501; 345/87; 382/145; 348/92; 250/559.45; 356/237.1, 390
   See application file for complete search history.

(56) References Cited

U.S. PATENT DOCUMENTS

| | | | | |
|---|---|---|---|---|
| 5,293,178 A | * | 3/1994 | Kobayashi | 345/87 |
| 5,339,093 A | * | 8/1994 | Kumagai et al. | 345/89 |
| 5,391,985 A | * | 2/1995 | Henley | 324/158.1 |
| 5,459,410 A | * | 10/1995 | Henley | 324/770 |
| 5,546,013 A | * | 8/1996 | Ichioka et al. | 324/770 |
| 5,638,461 A | * | 6/1997 | Fridge | 382/141 |
| 5,696,550 A | * | 12/1997 | Aoki et al. | 348/125 |
| 5,793,221 A | * | 8/1998 | Aoki | 324/770 |
| 5,999,012 A | * | 12/1999 | Listwan | 324/770 |
| 6,111,424 A | * | 8/2000 | Bosacchi | 324/770 |
| 6,630,840 B2 | * | 10/2003 | Tomita | 324/765 |
| 6,850,087 B2 | * | 2/2005 | Ito et al. | 324/770 |
| 6,983,067 B2 | * | 1/2006 | Cox | 382/145 |
| 7,166,856 B2 | * | 1/2007 | Cho et al. | 250/559.45 |
| 7,231,081 B2 | * | 6/2007 | Snow et al. | 382/151 |

FOREIGN PATENT DOCUMENTS

JP    11-259225    *    9/1999

* cited by examiner

*Primary Examiner*—Vinh P Nguyen
(74) *Attorney, Agent, or Firm*—Brinks Hofer Gilson & Lione

(57) ABSTRACT

A test apparatus having an auto probe and a test method using the same reduces difficulties in defect detection which are caused by a manual test by operators. The test apparatus includes an auto probe unit that contacts a panel of a display device. A test pattern is input to the panel. A vision unit installed above the panel collects a pattern displayed on the panel. A computer system analyzes and determines information about the collected pattern. Whereas the panel was previously tilted from a horizontal position and then examined by the operator manually, in the present test method a movable camera installed at an auto probe apparatus permits testing while the panel is in the horizontal position.

11 Claims, 3 Drawing Sheets

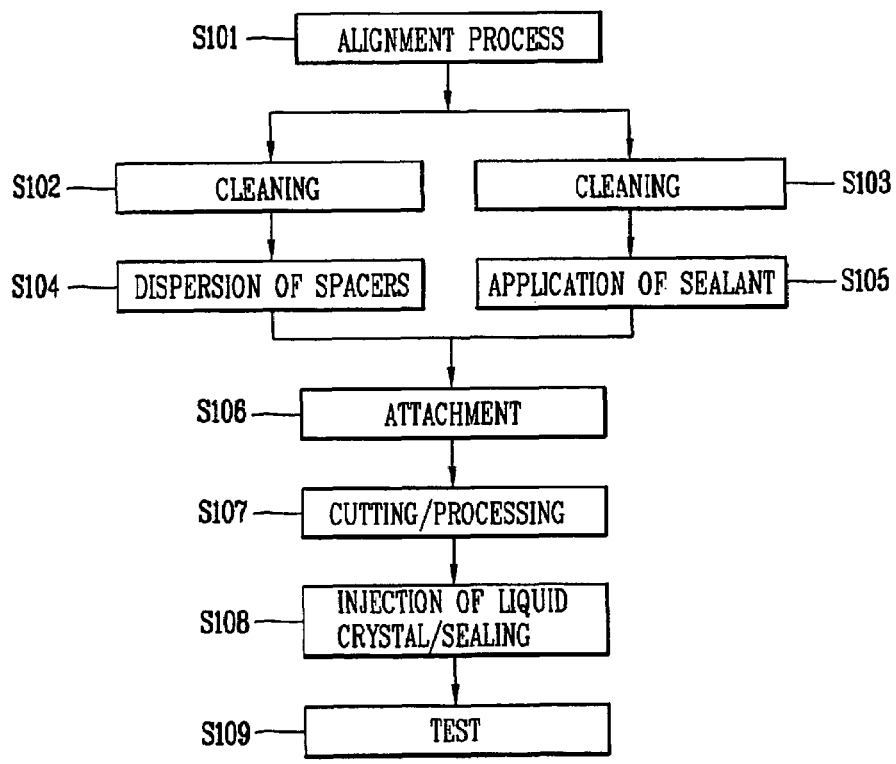
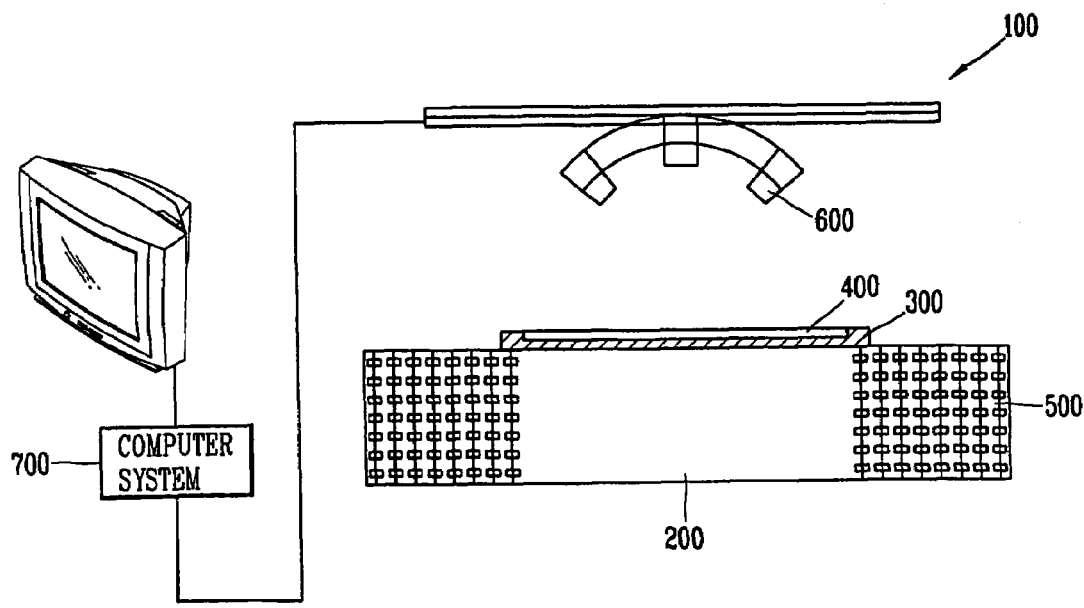

TEST APPARATUS HAVING AUTO PROBE THAT CONTACTS A DISPLAY DEVICE AND TEST METHOD USING THE SAME

PRIORITY CLAIM

The present application claims the benefit of Korean Application No. 2004-39352 filed on May 31, 2004, which is hereby incorporated by reference.

FIELD OF THE INVENTION

The present invention relates to a test apparatus having an auto probe and a test method using the same, and more particularly, to a test apparatus having an auto probe and a test method using the same which improve efficiency of a testing operation and a yield as the size of a module increases by installing a camera at an auto probe apparatus used for a cell check and performing a test in a horizontal direction.

DESCRIPTION OF THE RELATED ART

As interest in information displays and demand for portable information media increases, research and commercialization on light, thin film type flat panel display devices replacing traditional Cathode Ray Tubes (CRT) type display devices is actively being conducted. In particular, a liquid crystal display (LCD) device displays an image using optical anisotropy of liquid crystals, and is actively being applied to notebooks, desktop monitors or the like because it has an excellent resolution, color rendering capability and picture quality.

The LCD device includes an array substrate, a color filter substrate and a liquid crystal layer formed therebetween.

The array substrate includes gate lines and data lines horizontally and vertically arranged on the substrate to thereby define pixel regions, a thin film transistor (TFT), which is a switching device formed at a crossing of the gate line and the data line, and a pixel electrode formed on the pixel region.

In addition, the color filter substrate includes a color filter including sub-color filters R, G and B for implementing a color, a black matrix for dividing the sub-color filters and shielding light transmitting the liquid crystal layer, and a transparent common electrode for supplying a voltage to the liquid crystal layer.

The array substrate and the color filter substrate having such a construction are attached to each other by a sealant to thereby construct a liquid crystal display panel. The two substrates are attached to each other by means of an attachment key formed on the array substrate or the color filter substrate.

Such a liquid crystal display device is fabricated through an array substrate, a color filter process, a liquid crystal cell process and a module process.

In the array process, a thin film transistor array is fabricated on a first substrate by repeating deposition, photolithography and etching processes. In the color filter process, a black matrix is formed on a second substrate so as to shield light on all parts except for the pixel regions, color filters of red (R), green (G) and blue (B) are fabricated using dyes or paints, and then a common electrode is formed.

In addition, in the liquid crystal cell process, the first substrate where the thin film transistor forming process is completed and the second substrate where the color filter process is completed are attached to each other with an uniform cell gap maintained therebetween and liquid crystals are injected between the first substrate and the second substrate, thereby forming a liquid crystal display panel cell. In the module process, a circuit unit for processing a signal is fabricated and the liquid crystal display panel and the circuit unit are connected and attached to each other by a mounting technique, thereby fabricating a module.

Hereinafter, with reference to the accompanying drawings, a general liquid crystal cell process will be described in more detail.

FIG. 1 is a flowchart illustrating a fabrication process of a general liquid crystal display device, wherein a liquid crystal cell process is sequentially illustrated.

First, after alignment layers are formed on an array substrate and a color filter substrate, respectively, which are fabricated through an array process and a color filter process, an alignment layer process of providing liquid crystal molecules of a liquid crystal layer formed between the array substrate and the color filter layer with an anchoring force or a surface fixing force is performed (S101). The alignment process is performed in the order of washing before applying an alignment layer, printing the alignment layer, testing the alignment layer, and rubbing.

After the array substrate and the color filter substrate are cleaned (S102 and S103), spacers for maintaining a uniform cell gap are dispersed onto the array substrate, a sealant is applied on an outer portion of the color filter substrate, and then pressure is applied to the array substrate and the color filter substrate, so that the array substrate and the color filter substrate are attached to each other (S104 to S106).

The array substrate and the color filter substrate are formed of a large-area glass substrate. In other words, since a plurality of panel regions are formed on the large-area glass substrate and the thin film transistor and the color filter are formed on each of the panel regions, the glass substrate is cut and processed in order to fabricate separate liquid crystal panels (S107).

Finally, after liquid crystal molecules are injected into each of the above-processed liquid crystal display panels through a liquid crystal injection hole and a liquid crystal layer is formed by sealing the liquid crystal injection hole (S108), the test process is applied to determine whether or not each of the liquid crystal panels has a defect in appearance or an electrical defect to thereby fabricate a liquid crystal display panel (S109). An additional procedure of checking a state of the fabricated liquid crystal display panel by performing a defect test is performed to finish the cell process.

The final test is an auto probe test for a defect test to determine whether the defect in appearance or the electrical defect exists. The process tests, for example, for the existence of protrusion of the color filter, biased stain, a rubbing stripe, a pin hole, or a disconnection or short circuit of the gate and data lines. However, since in the conventional art, most of tests are performed manually by eye, it takes long time to test a large quantity of liquid crystal display panels and there is a limit of accuracy, thereby degrading operability for performing the above-described test.

That is, in the conventional art, a panel transferred to a table through a loader is inclined by 60 degrees for a manual test by the operator. The panel is moved upward and downward to come in contact with a probe unit, whereby the test is performed manually by eye.

Defects such as a point defect (PD), a line defect (LD) and a stain are detected by the manual test. According to operators' states and working environments, defect detection may not be appropriately performed and, especially as the difficulty increases with the increasing size of the substrate. Since a panel test is performed with the operators' eyes, the limitations of the test occur as the resolution and size of the model increase, and operation efficiency is lowered because of operators' cumulative fatigue.

SUMMARY OF THE INVENTION

A test apparatus having an auto probe and a test method using the same are presented which improve efficiency of a testing operation and yield as the size of a module increases by installing a camera at the auto probe and performing a test in a horizontal method, not in a tilt method.

By way of introduction only, as embodied and broadly described herein, in one embodiment a test apparatus is provided. The test apparatus comprises an auto probe unit contacting a panel and inputting a test pattern to the panel. A vision unit is installed over the panel and collects a pattern displayed on the panel. A computer system analyzes and determines information about the collected pattern.

In another embodiment, an auto probe test method comprises: loading an auto probe unit with a panel for testing; inputting a pattern signal to the panel through the auto probe unit; collecting a pattern displayed on the panel according to the inputted signal using a vision apparatus; and analyzing information about the collected pattern using a computer system and determining whether the panel has a defect or not.

In another embodiment, a method of automatically testing a panel of a display device comprises: conveying the panel to a testing location; connecting multiple probes to circuitry on the panel after the panel reaches the testing location; supplying a set pattern of signals to the circuitry through the probes; collecting a display pattern displayed on the panel resulting from supply of the set pattern; and determining whether the panel has a defect from the collected pattern.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a flowchart illustrating a fabrication process of a general liquid crystal display device;

FIG. 2 is an exemplary view schematically illustrating a test apparatus having an auto probe in accordance with embodiment of the present invention;

DETAILED DESCRIPTION OF THE PREFERRED EMBODIMENTS

Figure 3:
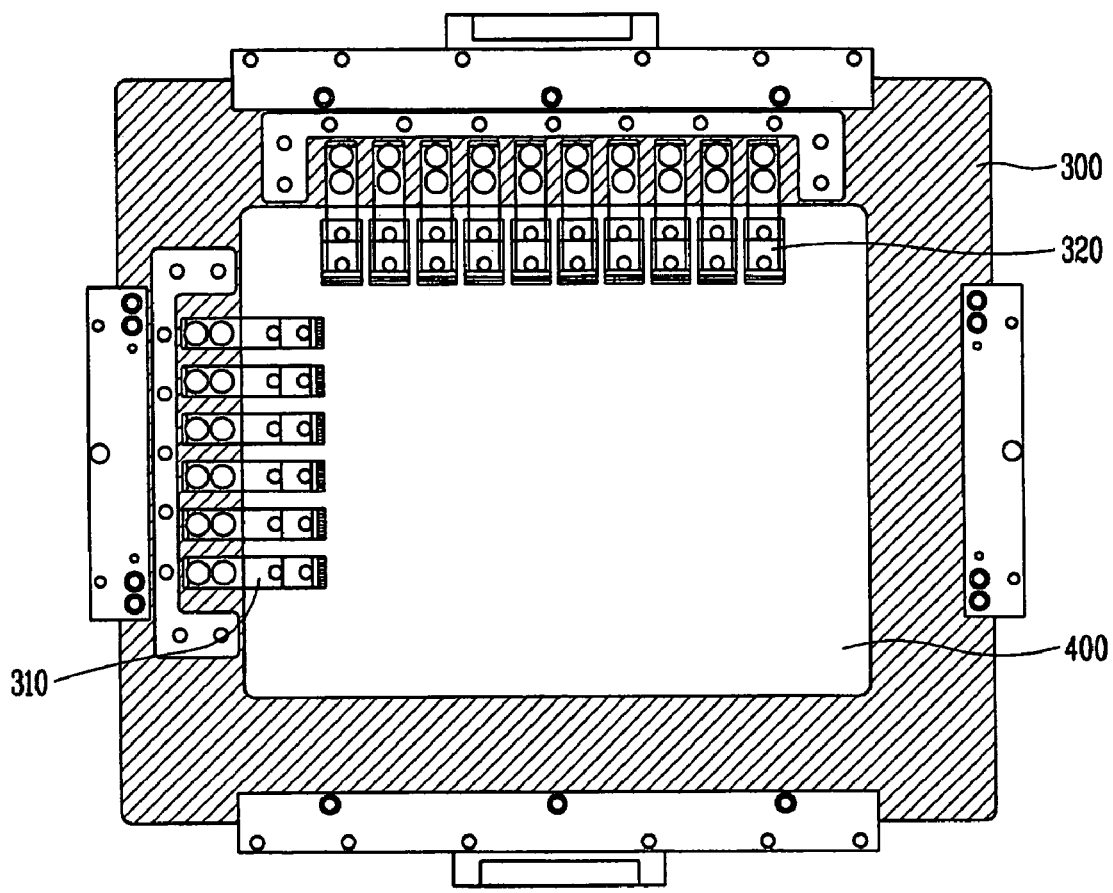
FIG. 3 is an enlarged exemplary view illustrating an auto probe unit of the test apparatus having the auto probe illustrated in FIG. 2.

Reference will now be made in detail to the preferred embodiments of the present invention, examples of which are illustrated in the accompanying drawings.

Hereinafter, the preferred embodiment of a test apparatus having an auto probe and a test method using the same in accordance with the present invention will be described in detail with reference to the accompanying drawings.

FIG. 2 is an exemplary view schematically illustrating a test apparatus having an auto probe in accordance with an embodiment of the present invention.

As illustrated therein, a test apparatus having an auto probe for testing a liquid crystal display device after finishing a cell process includes an auto probe unit 300 contacting a panel 400 and inputting a check pattern to the panel 400; a vision unit 100 having a vision apparatus such as a camera 600 for detecting a pattern displayed on the panel 400; and a computer system 700 for analyzing a signal inputted to the camera 600.

The camera 600 above the panel 400 scans the panel 400 in a horizontal direction, collects a pattern for testing which is inputted by the auto probe unit 300 and displayed on the panel 400, and transmits the collected pattern for testing to the computer system 700. The camera 600 may include a CCD (charge coupled device) camera 600.

The camera 600 is operated within a predetermined angular range (e.g., 0 to 7 degrees, 80 to 100 degrees and 110 to 160 degrees) in order to provide complement defect detection varying according to a viewing angle, thereby improving defect testing power by performing a test according to the above-described method.

By installing the vision apparatus such as the camera 600 at the test apparatus having the auto probe, the limitations of the test performed by the operators' eyes are complemented to thereby improve operation efficiency and productivity because of the number of defective modules decreases.

Meanwhile, an auto probe unit 300 in contact with the panel 400 is installed on a support member 200, and a driving apparatus 500 is installed on the support member 200 in order to load/unload the panel 400 onto/from the auto probe unit 300 and drive the support member 200 in every direction.

When the panel 400 is loaded onto the support member 200 in a conveyor logistics system and a test is performed in a horizontal direction using the vision apparatus, a loader unit used for the existing 60 degree tilt method can be eliminated. That is, since the test can be performed in the horizontal direction, the panel 400 for testing can rest on the auto probe unit 300 of the supporting member 200 in the horizontal direction in the logistics system such as the conveyor. Thus, jobs such as inclining the panel by 60 degrees after transferring the panel 400 for testing to a table through the loader, and contacting the panel with the probe unit 300 by moving it upward and downward can be eliminated.

Hereinafter, the auto probe unit will be described in detail with reference to the accompanying drawing.

FIG. 3 is an enlarged exemplary view illustrating the auto probe unit of the test apparatus having the auto probe illustrated in FIG. 2.

As illustrated therein, the auto probe unit 300 is provided with gate needles 310 and data needles 320 for electrically connecting with gate lines (not shown) and data lines (not shown) of each unit panel 400. The gate needle 310 and the data needle 320 connect with the gate line and the data line, respectively, of the unit panel 400. The gate needle 310 and the data needle 320 are arbitrarily supplied with voltages, thereby performing a test for determining whether or not the unit panel 400 has a defect in appearance or an electric defect before the module process of connecting a driving circuit for driving the panel 400. The gate needles 310 and the data needles 320 accurately come in contact with pads (not shown) of the gate lines and the data lines.

That is, in the auto probe test, the test for determining whether the unit panel 400 has a defect in appearance or an electric defect is performed by arbitrarily supplying voltages to the gate needles 310 and the data needles 320. The gate needles 310 and the data needles 320 are controlled to accurately come in contact with the pads of the gate line and the data line.

As mentioned above, the test apparatus having the auto probe in accordance with the embodiment of the present invention includes: the auto probe unit 300 provided with a plurality of needles 310 and 320 for inputting a set pattern to the panel 400 for testing and performing a defect test of the unit panel 400; the camera 600 located above the auto probe unit 300 and collecting a pattern displayed on the panel 400 through a scan in the horizontal direction; and the computer system 700 receiving information from the camera 600 and analyzing and determining whether or not a desired pattern is displayed.

The test apparatus having the auto probe having such a construction can perform a stable auto probe test by preventing deterioration in operability which is caused by the traditional manual work.

Hereinafter, a test method using the test apparatus having the auto probe having such a construction, for example, will be described.

Figure 4A:
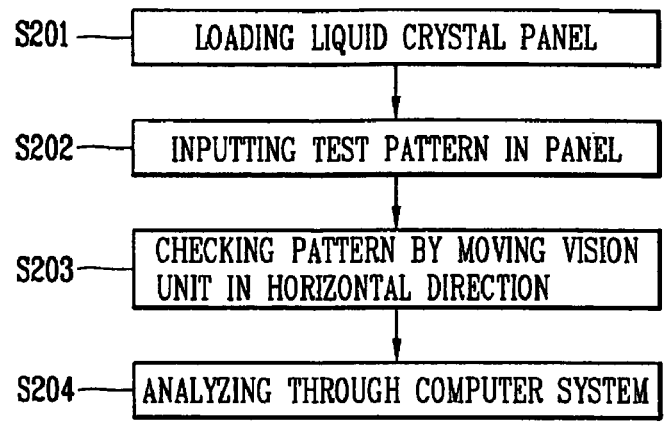
FIGS. 4A and 4B are flowcharts respectively illustrating a method for detecting a defect using the test apparatus having the auto probe in accordance with the embodiment of the present invention.
Figure 4B:
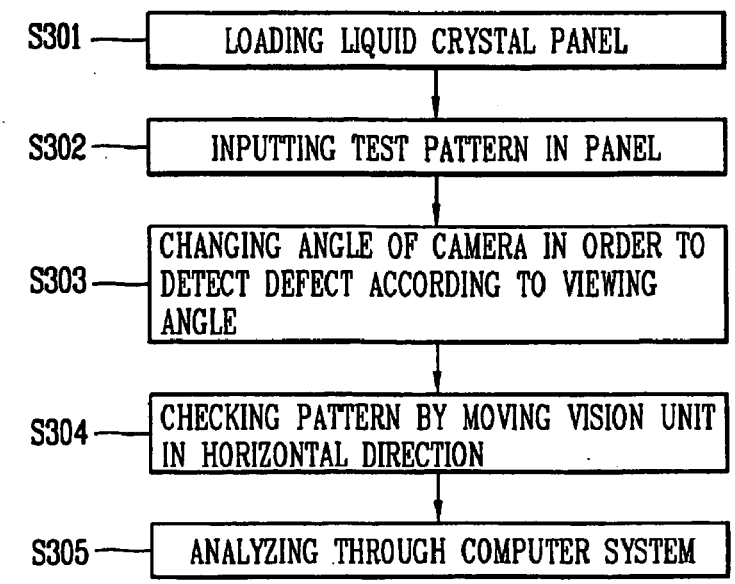

FIGS. 4A and 4B are flowcharts respectively illustrating a method of detecting a defect using the test apparatus having the auto probe in accordance with the embodiment of the present invention.

First, FIG. 4A shows a method of performing a test when the angle of the camera is fixed. An auto probe test starts as a unit panel for testing rests on an auto probe unit of a supporting member by a transfer method using a conveyor in a horizontal direction (S201).

The panel for testing is controlled to allow a gate pad and a data pad to accurately come in contact with gate needles and data needles, respectively.

Thereafter, a pattern signal for the test is inputted through the gate pad and the data pad of the panel which are in contact with a plurality of needles of the auto probe unit (S202).

Such an auto probe test is a process of testing a check stain, a black stain, a color filter protrusion, a bias spot, a rubbing stripe, a pin hole, a disconnection or a short circuit of the gate line and the data line or the like. The test is performed through the auto probe unit according to set items.

Thereafter, a pattern displayed on the panel according to the inputted signal is scanned by horizontally moving the vision apparatus provided with the camera thereon, thereby collecting the pattern (S203).

The collected pattern information is analyzed and determined using an information processing device such as a computer. By repeating the above-described processes of repetitive input of set patterns with respect to several items, analysis and determination, the test is completed (S204).

FIG. 4B shows a method of performing a test when the angle of the camera is changed in order to detect a defect according to a viewing angle. As described above, the auto probe test starts as the unit panel for testing rests on the auto probe unit of the supporting member by a transfer method using a conveyor in a horizontal direction (S301).

Thereafter, a pattern signal for the test is inputted through the gate pad and the data pad of the panel which are in contact with a plurality of needles of the auto probe unit (S302).

Then, the angle of the camera of the vision unit is changed in order to detect a defect according to the viewing angle (S303). Defect testing power can be improved by performing the test by changing an angular range of the camera to 0 to 70 degrees, 80 to 100 degrees, 110 to 160 degrees or the like according to the viewing angle of the panel.

In addition, the number of cameras installed according to the embodiment of the present invention and an operation method thereof can be appropriately controlled according to the size and resolution of the panel for testing.

Thereafter, the pattern displayed on the panel according to the inputted signal is scanned by horizontally moving the vision unit provided with the camera thereon, thereby collecting the pattern (S304).

The collected pattern information is analyzed and determined using an information processing device such as a computer. By repeating the above-described processes of repetitive input of set patterns with respect to several items, analysis and determination, the test is completed (S305).

As described so far, the test apparatus having the auto probe and the method of testing using the same in accordance with the present invention can improve operators' efficiency and yield by improving the limitations of a manual test as the size of a module increases by automatically testing a panel using a camera, rather than the operator's eyes.

In addition, the present invention can improve defect detection according to the viewing angle by performing a test in a horizontal method, not in a tilt method and by changing camera angles.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A test apparatus having an auto probe, comprising:

an auto probe unit having a plurality of gate needles and data needles configured to facilitate electrical communication with a plurality of corresponding contacts on a panel of a display device;

the auto probe unit configured to input a test pattern to the panel performed by arbitrarily supply voltage to the gate needles and the data needles, wherein the auto probe unit performs a test for determining whether or not the panel has a defect in appearance or an electric defect before a module process of connecting a driving circuit for driving the panel;

a supporting member provided with the auto probe unit thereon;

a vision unit installed above the panel configured to collect data corresponding to a pattern of the visible light displayed on the display device, wherein the vision unit comprises a vision apparatus that scans the panel in a horizontal direction and collects the pattern displayed on the panel during the test, wherein the vision apparatus operates within a plurality of predetermined angular ranges including 0 to 70 degrees, 80 to 100 degrees, and 110 to 160 degrees during the test to provide complement defect detection varying according to the viewing angle of the panel and wherein the panel is loaded onto the supporting member in a conveyor logistics system and the test is performed in a horizontal direction using the vision apparatus;

a computer system in communication with the vision unit configured receive the collected data from the vision unit and to analyze the data to determine if a defect exists; and the computer system configured to control movement of the vision unit in horizontal direction relative to the panel and in a tilting direction relative to the panel.

2. The test apparatus of claim 1, wherein the plurality of gate needles and data needles contact gate lines and data lines, respectively, of the panel and supplies signals.

3. The test apparatus of claim 1, wherein the vision apparatus comprises a CCD camera.

4. A method of automatically testing a panel of a display device, the method comprising:

conveying the panel to a testing location;

connecting a plurality of gate needles and data needles of an auto probe unit to circuitry on the panel after the panel reaches the testing location;

supplying a predetermined pattern of signals to the circuitry through the probes performed by arbitrarily supply voltage to the gate needles and the data needles;

collecting a visible light corresponding to the pattern displayed on the display device using a vision system;

scanning the panel multiple times by a vision apparatus during collection of the display pattern as the panel for testing rests on the auto probe unit of a supporting member by a transfer method using a conveyor in a horizontal direction, wherein the vision apparatus alters a relative angle between the panel and the vision apparatus multiple times and wherein the relative angle between the panel and the vision apparatus limits to ranges 0 to 70 degrees, 80 to 100 degrees, and 110 to 160 degrees dependent on a viewing angle of the panel;

moving the vision system in a horizontal direction relative to the panel to collect the visible light corresponding to the pattern displayed on the display device;

tilting the vision system at an angle relative to the panel to collect the visible light corresponding to the pattern displayed on the display device; and determining whether the panel has a defect from the collected patterns, wherein the plurality of gate needles and data needles perform a test for determining whether or not the panel has a defect in appearance or an electric defect before a module process of connecting a driving circuit for driving the panel.

5. The method of claim 4, wherein collection of the display pattern occurs without tilting the panel.

6. The method of claim 4, further comprising maintaining a position of the panel throughout collection of the display pattern.

7. The method of claim 4, further comprising moving the vision apparatus during at least one of the scans of the panel to scan the panel without adjusting the relative angle.

8. The method of claim 4, wherein the collection occurs by moving a vision apparatus at multiple angles relative to a surface of the panel.

9. The method of claim 4, further comprising scanning a vision apparatus across the panel to collect the display pattern.

10. The method of claim 4, further comprising comparing the collected pattern with a test pattern to determine whether the panel has a point defect, a line defect or a stain.

11. The method of claim 4, further comprising loading the panel onto an auto probe unit containing the probes without tilting the panel with respect to a direction from which the panel was conveyed to the testing location.

* * * * *